United States Patent [19]
Anders et al.

[11] Patent Number: 6,065,791
[45] Date of Patent: May 23, 2000

[54] COLLET END EFFECTOR

[75] Inventors: Carl J. Anders; Jean Marc Devlin; Alexander McKay; Ian F. Armitage, all of Brampton, Canada

[73] Assignee: MacDonald Dettwiler Space and Advanced Robotics Ltd., British Columbia, Canada

[21] Appl. No.: 09/087,854

[22] Filed: Jun. 1, 1998

[51] Int. Cl.[7] .............................. B66C 1/42; B25J 13/00
[52] U.S. Cl. .................. 294/116; 294/902; 294/907; 901/47
[58] Field of Search ..................... 294/116, 115, 294/86.28–86.31, 907, 902, 100; 901/31, 47

[56] References Cited

U.S. PATENT DOCUMENTS

| 4,034,542 | 7/1977 | Loehr | 294/116 |
|---|---|---|---|
| 4,704,056 | 11/1987 | Babel | 409/233 |
| 5,308,582 | 5/1994 | Serra | 294/116 |
| 5,332,275 | 7/1994 | Conway et al. | 294/100 |
| 5,641,190 | 6/1997 | Christensen | 294/116 |

FOREIGN PATENT DOCUMENTS

| 1108876 | 6/1961 | Germany | 294/116 |
|---|---|---|---|
| 1148719 | 5/1963 | Germany | 294/116 |
| 770790 | 1/1979 | U.S.S.R. | 294/116 |
| 975387 | 11/1982 | U.S.S.R. | 294/116 |
| 920155 | 3/1963 | United Kingdom | 294/116 |

*Primary Examiner*—Dean J. Kramer
*Assistant Examiner*—Paul T. Chin

[57] ABSTRACT

A collet end effector comprises two jaws pivotably mounted in a housing for movement between an open and a closed position. A collet sleeve surrounds the jaws and is slidably mounted in the housing for movement along the jaws toward and away from a gripping end of the jaws. Each of the jaws has a cam surface; the collet sleeve has collet bearings for riding along the cam surface. The cam surface has a ramp region configured such that as the collet sleeve moves toward the jaws gripping end while the collet bearings ride along the ramp region, the jaws move toward the jaws closed position. The cam surface also has a dwell region extending from the ramp region toward the jaw gripping end configured such that as the collet sleeve moves toward the jaw gripping end while the collet bearings ride along the dwell region, the jaws are maintained in the jaw closed position. After the jaws have clamped a gripping fixture, this "overtravel" region of the sleeve allows mating of in electrical connector on the sleeve with an interface.

15 Claims, 10 Drawing Sheets

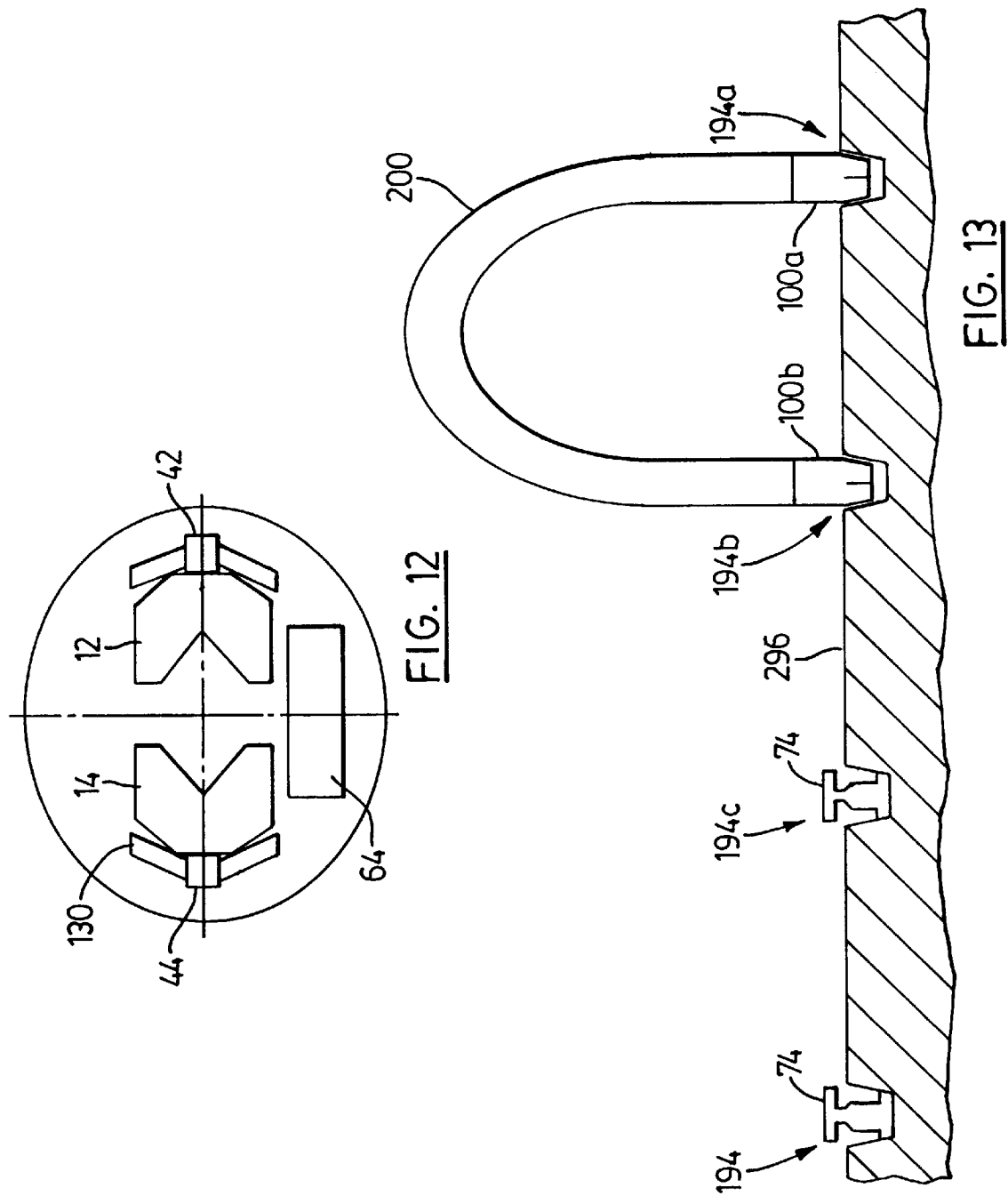

COLLET END EFFECTOR

BACKGROUND OF THE INVENTION

This invention relates to an end effector and to a gripping system including an end effector.

For certain applications, such as terrestrial and non-terrestrial (space) applications, machines and components may be designed for compactness. An end effector which may be used in association with these machines should be capable of working in a compact envelope. Such an end effector should also be capable of very reliable and diverse operations as back-up systems may be few.

The subject invention seeks to provide an end effector which will function in a compact environment and will function reliably.

SUMMARY OF THE INVENTION

According to the present invention, there is provided an end effector comprising: a jaw pivotably mounted for movement between an open and a closed position; a collet sleeve mounted exteriorly of said jaw for sliding movement along said jaw toward and away from a gripping end of said jaw; one of said jaw and said collet sleeve having a cam surface, another of said jaw and said collet sleeve having a cam for riding along said cam surface; said cam surface having a ramp region configured such that as said collet sleeve moves toward said jaw gripping end while said cam rides along said ramp region, said jaw moves toward said closed position; said cam surface having a dwell region extending from said ramp region toward said jaw gripping end configured such that as said collet sleeve moves toward said jaw gripping end while said cam rides along said dwell region, said jaw is maintained in said jaw closed position.

BRIEF DESCRIPTION OF THE DRAWINGS

In the figures which disclose example embodiments of the invention,

FIG. 12 is a simplified front view of the end effector of FIG. 8, and FIG. 13 is a schematic view of a robot arm incorporating end effectors made in accordance with this invention shown in an environment.

DESCRIPTION OF THE PREFERRED EMBODIMENTS

Figure 6:
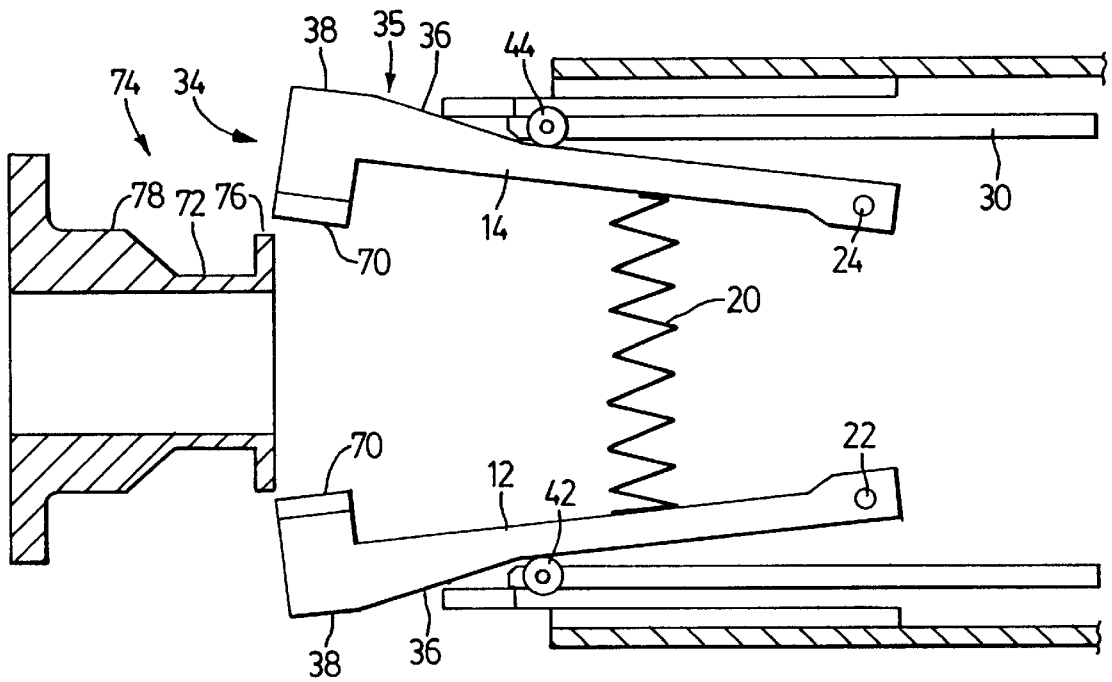
Figure 7:
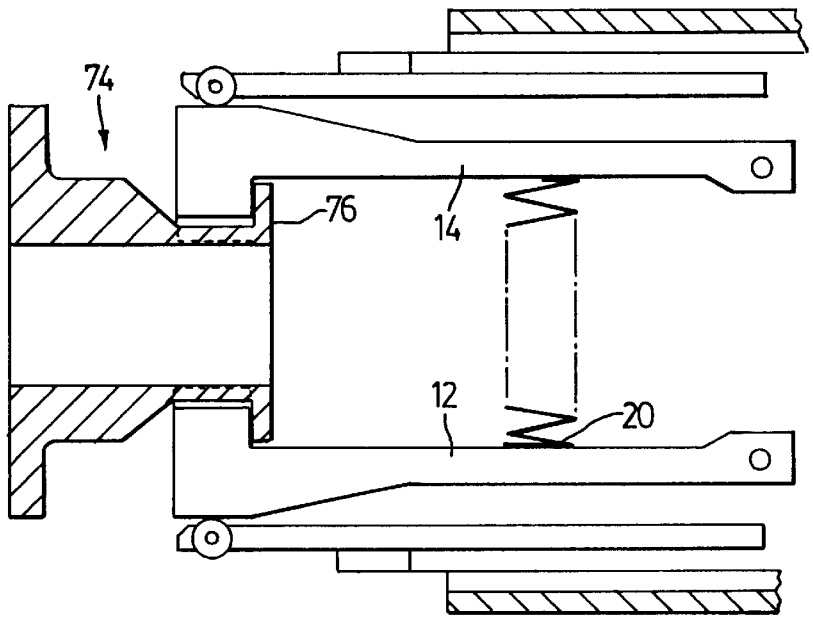

With reference to FIGS. 1 through 4, end effector 10 comprises a pair of jaws 12, 14 pivotably mounted to housing 16 by pivot pins 22, 24, respectively and biased to a jaw open position by a spring 20 (seen in FIG. 6). A collet sleeve 30 surrounds the jaws and is mounted to the housing 16 on linear bearings 32 for sliding movement toward and away from the gripping end 34 of the jaws 12, 14. Slots 17 in the sleeve receive the pivot pins 22, 24 so that the sleeve 30 does not interfere with the pivot pins when sliding along the jaws. Each of the jaws has a cam surface 35, having, as best seen in FIGS. 6 and 7, a ramp region 36 and a dwell region 38, the dwell region extending from the ramp region toward the gripping end of the jaws. For each of the jaws 12, 14, the sleeve has a cam in the nature of collet bearing 42, 44, respectively, which rides on the cam surface 35 of the jaw. As seen in FIG. 6, with the sleeve in its retracted position, the collet bearings are positioned just behind the ramp surface of the jaws and the jaws are in their jaw open position. The sleeve has a medial V-notch 48 (FIG. 2) sized for receiving truncated V-shaped protrusions 52, 54 of jaws 12, 14, respectively. A drive motor 51 with gearbox 50 and ball screw 56 is provided to drive the collet sleeve 30 toward and away from the gripping end 34 of the jaws 12, 14.

A compliant nut driver 57 is located between the jaws 12, 14. Referencing FIG. 4, the nut driver is rotated by drive motor 58 through gearing 59, drive shaft 60, and gearbox 61. The nut driver 57 is keyed to the gearbox 61 so as to be free to slide axially and is biased to an extended position by wave spring 65.

An electrical connector 64 is supported on the collet sleeve 30 below the jaws and is directed toward the gripping end 34 of the jaws 12, 14. A camera 66 is supported in the upper housing 16 and a pair of lights 68 are supported by the housing 16 above the jaws.

Figure 5:
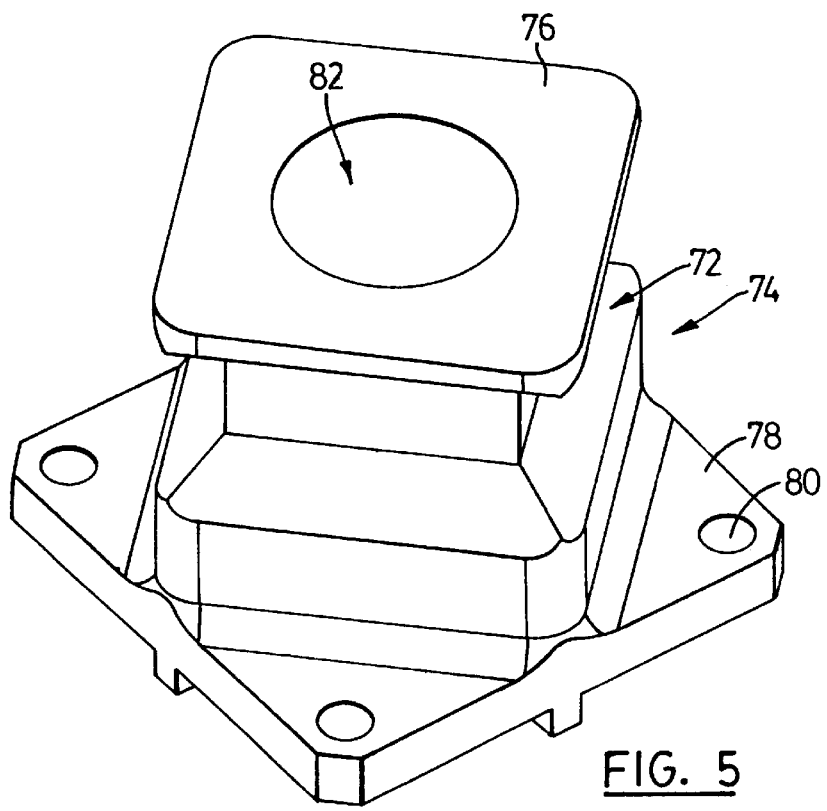
FIG. 5 is a perspective view of a gripping fixture which may be gripped by the end effector of FIG. 1, FIGS. 6 and 7 are schematic cross-sectional views illustrating the operation of the end effector of FIG. 1.
Figure 4:
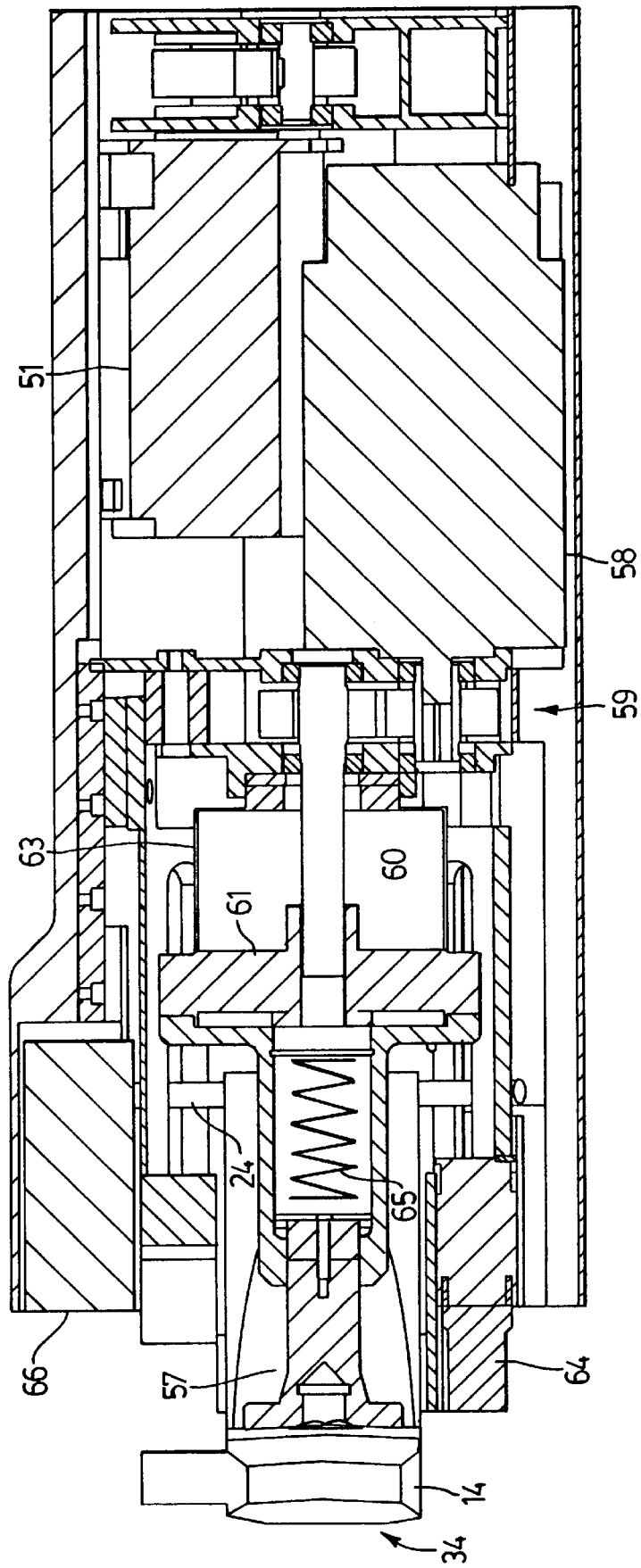
FIG. 4 is a cross-sectional view along the lines A—A of FIG. 3.

Referencing FIGS. 5 through 7, the jaws have lips 70 at their gripping end 34 to engage a throat 72 of gripping fixture 74 formed between the head 76 and body 78 of the gripping fixture. The fixture has mounting holes 80 about its body by way of which the fixture is mounted to a bed (not shown). The bed may be part of a base unit and the fixture also has a central through bore 82 which may receive a bolt 84 (FIG. 2) for mounting the base unit to another body.

Figure 2:
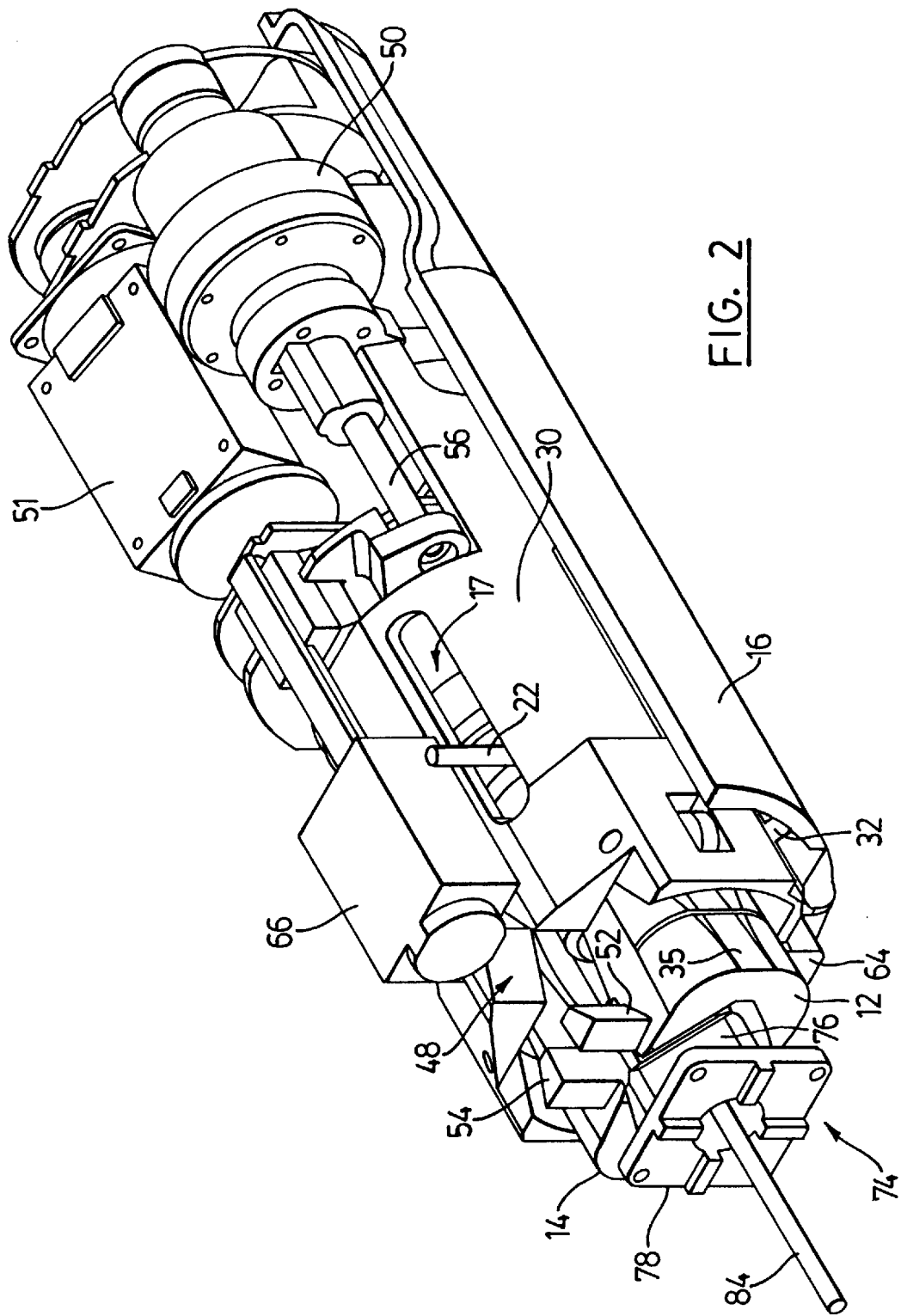
FIG. 2 is a partially cut-away perspective view of the end effector of FIG. 1 shown in conjunction with a gripping fixture.
Figure 3:
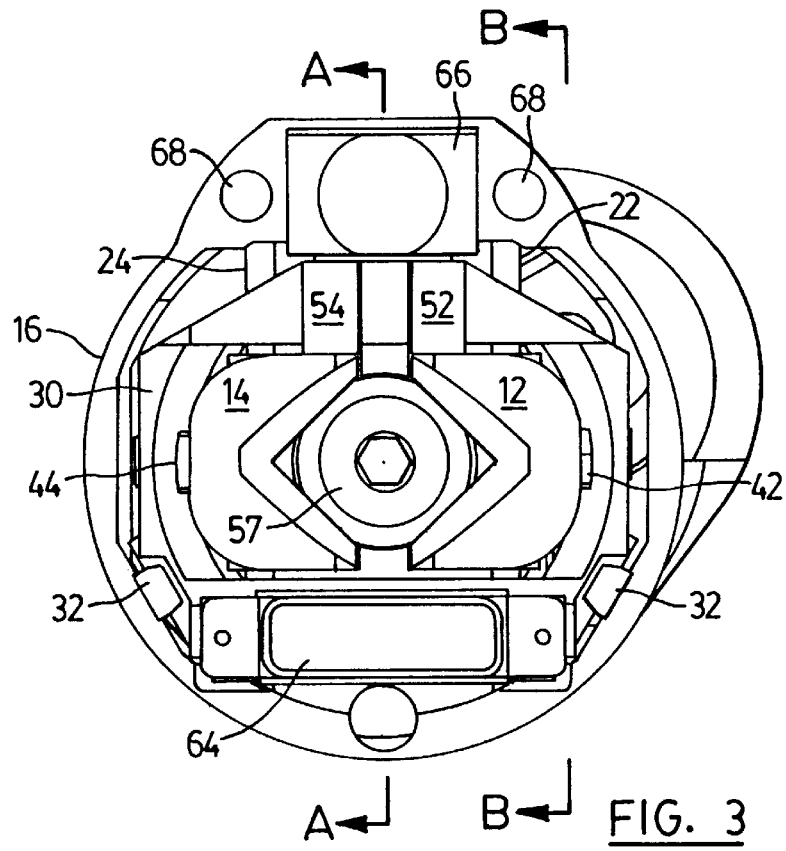
FIG. 3 is a front view of the end effector of FIG. 1.

In operation, with the collet sleeve retracted such that the jaws 12, 14 are in their open position illustrated in FIG. 6, with the help of camera 66 and lights 68, end effector 10 may be manipulated until the lips 70 of the jaws pass over the head 76 of gripping fixture 74, as illustrated in FIG. 2. Next drive 51 may be activated to turn ball screw 56 so that the collet sleeve moves toward the gripping end 34 of the jaws. As this occurs, the collet bearings 42 ride up the ramp region 36 of the jaws toward the dwell region 38 of the jaws forcing the jaws toward their jaws closed position against the biasing pressure of spring 20. Once the collet bearings reach the dwell region of the jaws, the jaws are in their closed position illustrated in FIG. 7. Movement of the collet bearings along the dwell region of the jaws simply maintains the jaws in their jaws closed position.

The movement of the sleeve forwardly while the collet bearings ride on the dwell region of the jaws (which may be referred to as "overtravel" of the sleeve) allows mating of the electrical connector 64 carried by the collet sleeve with an interface (not shown) on the bed to which the gripping fixture 74 is attached. The electrical connector may comprise metal conductors or fibre-optic strands to allow the passing of power or data between the electrical connector and the interface. From this operation, it will be apparent that should the jaws not be properly positioned on the gripping fixture such that the jaws may not be forced to their jaws closed position by the collet sleeve, it will be impossible to attempt to mate the electrical connector. This is advantageous since the electrical connector is then protected from damage.

Another advantage of the overtravel of the sleeve is to release a latch. For example, the jaws may be used to grip a gripping fixture on the end of a tool and the overtravel of the sleeve used to release a latch holding the tool in a tool holder.

It should also be noted that as the jaws are moved to their jaws closed position by forward movement of the collet sleeve, the protrusions 52, 54 on the jaws are moved onto abutting, relation with one another. Further forward movement of the collet sleeve 30 then results in the protrusions 52, 54 entering the V-notch 48 in the sleeve, and, when the sleeve is in its forward most position, abutting the sides of this notch. This connection between the jaws and the sleeve passes any torque on the jaws to the sleeve, rather than to the jaw pivots. The collet sleeve may be provided with a micro switch (not shown) which will close just as the sleeve reaches its most forward most position to cause the drive 51 to cease driving the sleeve. This avoids the drive jamming the sleeve against the jaw protrusions.

As the jaws move over the end of a gripping fixture, if there is a bolt 84 in the bore 82 of the gripping fixture 74, then the compliant nut driver will abut the end of the bolt and be pushed rearwardly against the urging of the wave spring 65 as the jaws continue to move forwardly. After the jaws are clamped onto the gripping fixture, rotation of the nut driver by drive 58 will cause the nut driver to engage the end of the bolt, if it does not engage naturally as the end effector moves into position. After engagement, further rotation of the nut driver, turns the bolt. In this way, the bolt may either be engaged or disengaged from a part.

Figure 1:
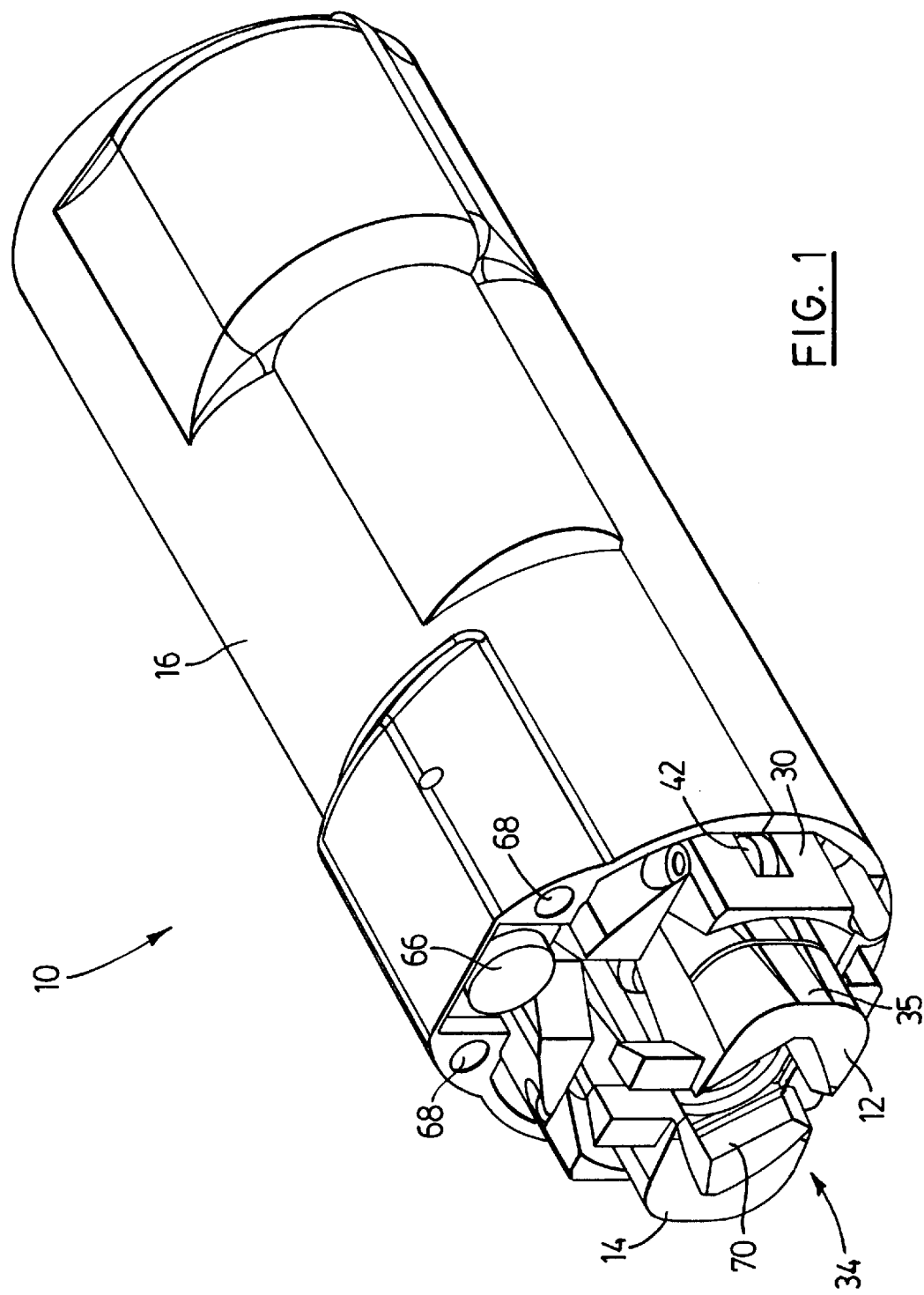
FIG. 1 is a perspective view of an end effector made in accordance with this invention.
Figure 8:
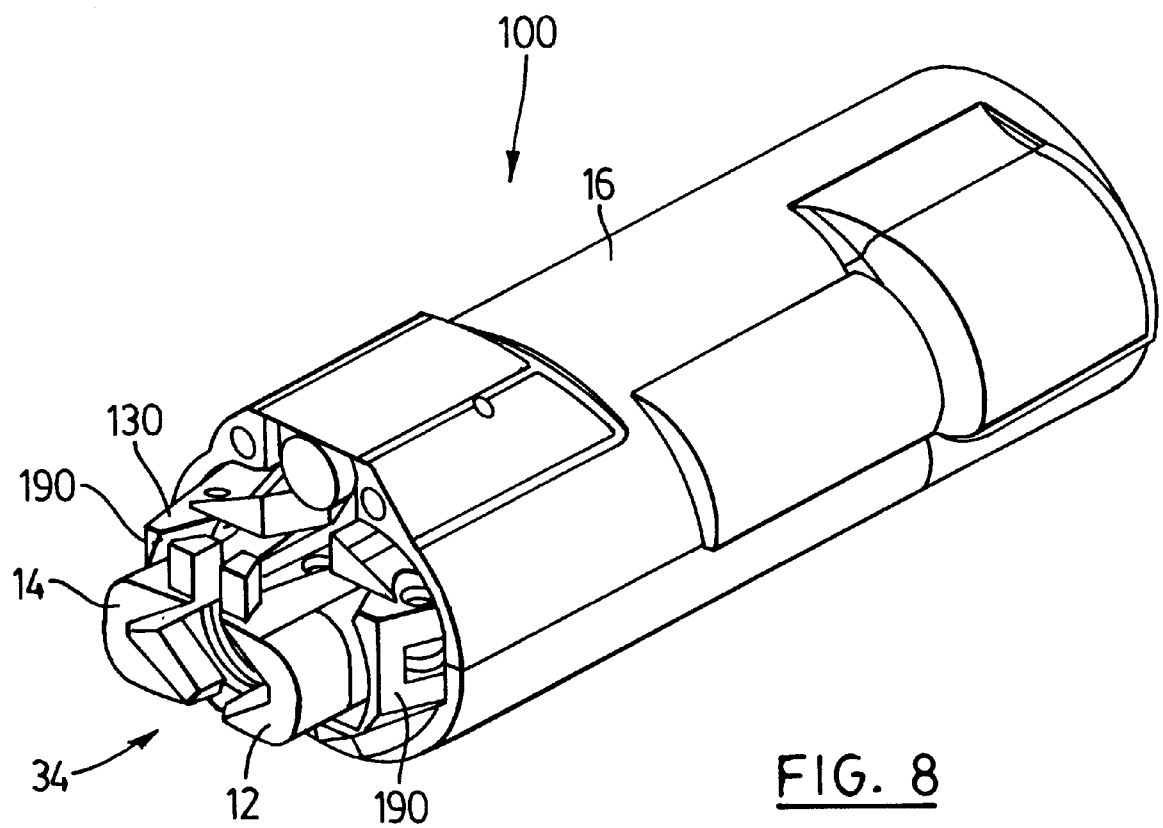
FIG. 8 is a perspective view of an end effector made in accordance with another aspect of this invention.

Turning to FIG. 8, end effector 100 is identical to end effector 10 of FIG. 1 except that the outer surface 190 of collet sleeve 130 is tapered toward the gripping end 34 of the jaws 12, 14.

Figure 9:
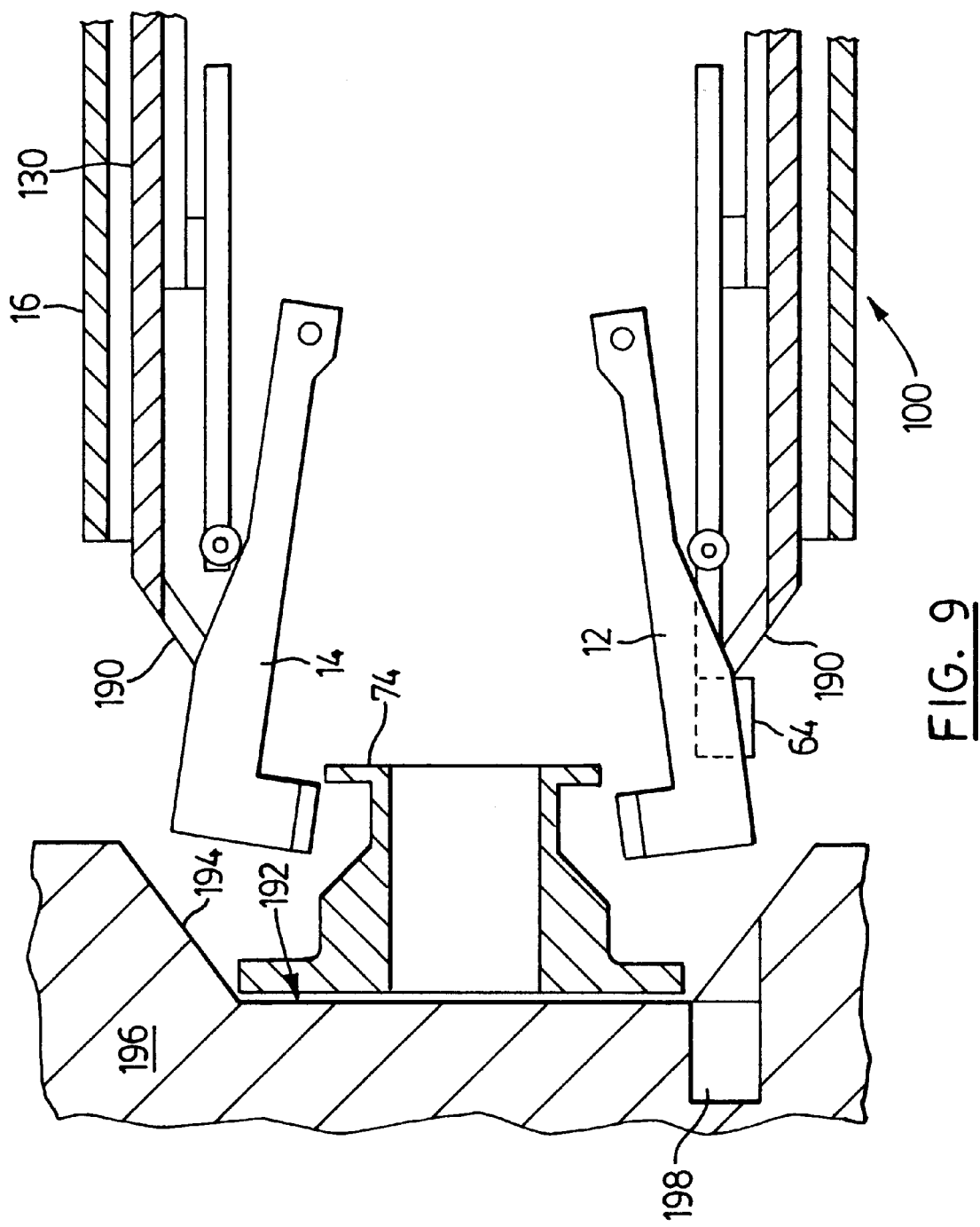
FIGS. 9 through 11 are schematic cross-sectional views illustrating the operation of the end effector of FIG. 8.

Referencing FIG. 9, end effector 100 is designed for gripping a gripping fixture 74 mounted to a base 192 of a tapered well 194 in a bed 196. The taper of well 194 is complementary 10 the taper of the surface 190 of sleeve 130.

Figure 10:
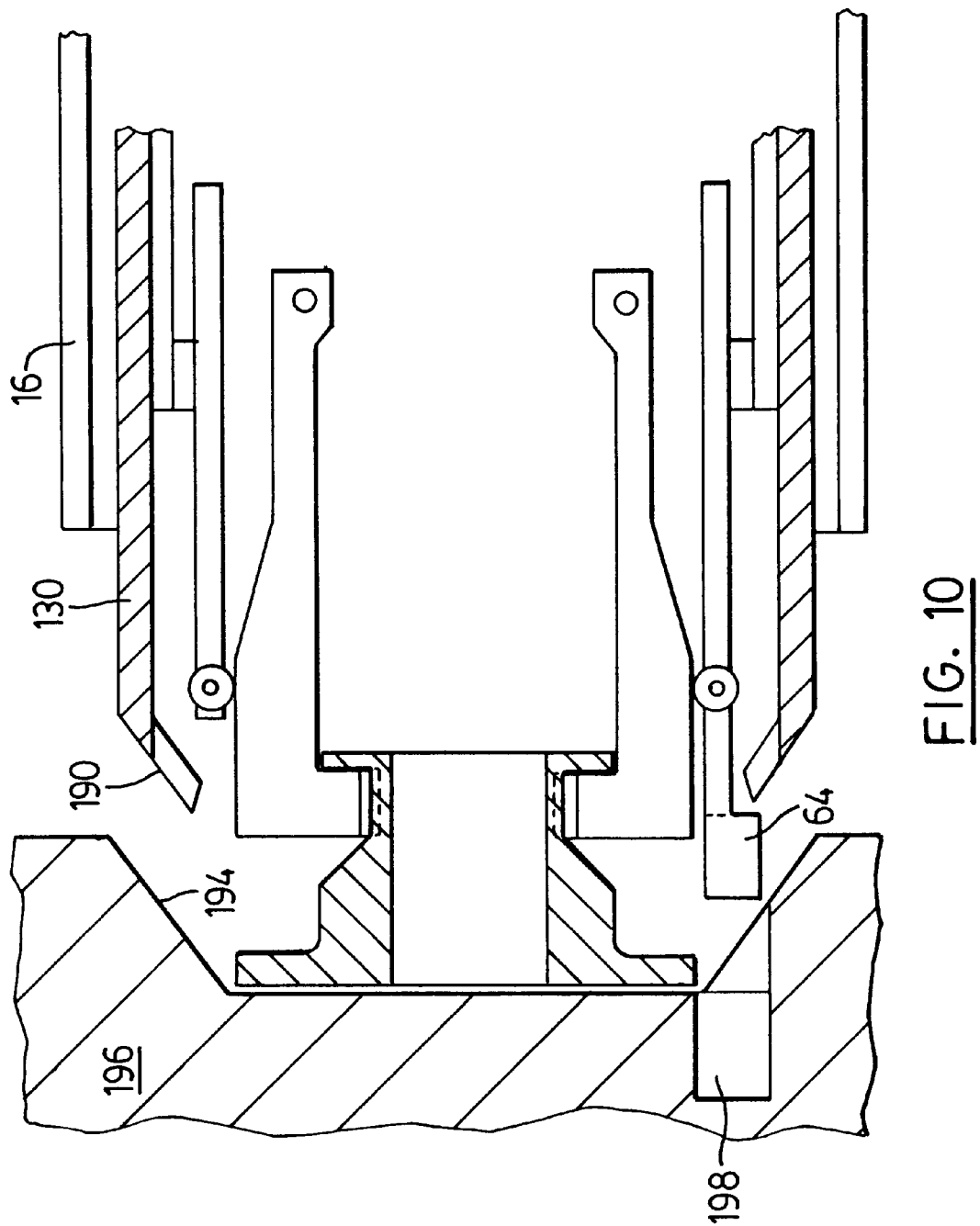
Figure 11:
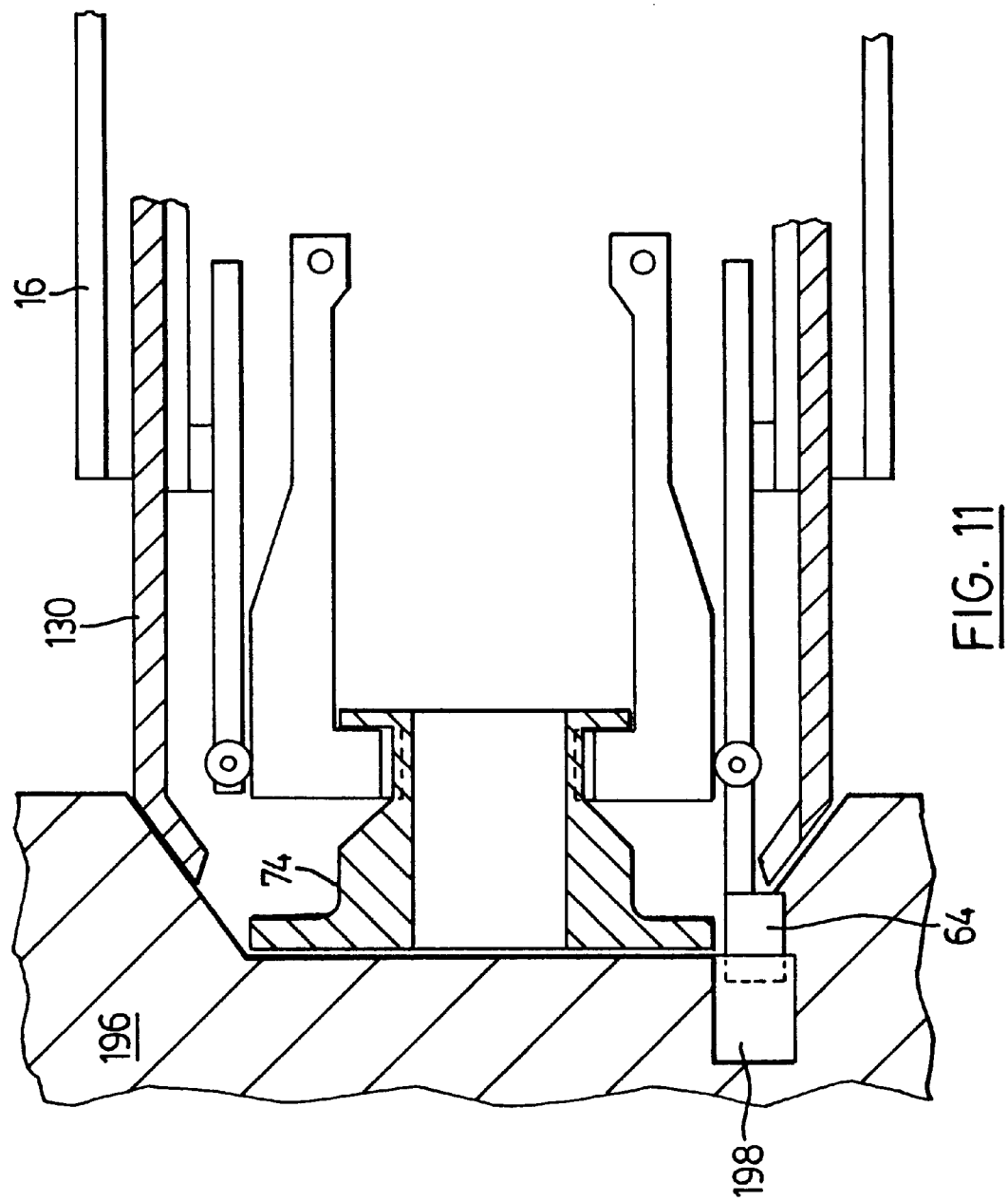

In operation, the jaws 12, 14 of end effector 100 are positioned over a gripping fixture 74, as seen in FIG. 9. Next, the collet sleeve is driven forwardly to clamp the jaws to the gripping fixture, as shown in FIG. 10. The collet sleeve is then driven into its overtravel region until the outer surface 190 of the sleeve matingly abuts the tapered well 194 of bed 196, as seen in figure 11. The mating abutment of the sleeve with the side of the well absorbs any bending load between the end effector and the bed, rather than requiring the jaws and gripping fixture to absorb this load. Thus, the mating abutment of sleeve and well strengthens the connection between the end effector and the bed. To ensure a strong mating abutment, the sleeve drive may drive the sleeve into the sides of the well without use of any other stop, such as the micro switch described in conjunction with the embodiment of FIG. 1.

FIGS. 9 through 11 also show the electrical connector 64 of the end effector 100 (rotated by 90 degrees out of its true position for illustrative purposes). From these figures, it will be apparent that the electrical connector 64 connects to an interface 198 of bed 196 when the sleeve 130 travels along its overtravel region into abutment with the well 194. FIG. 13 is a schematic front view of end effector 100 showing the true position of electrical connector 64.

FIG. 13 illustrates an exemplary use of end effectors 100. Turning to FIG. 13, a robot 200 has end effectors 100a, 100b at its two ends. The robot 200 is designed for travelling along a bed 296 provided with a plurality of wells 194, each containing a gripping fixture 74. In operation, if the end effectors 100a, 100b are gripping gripping fixtures of proximate wells 194a, 194b, as illustrated in FIG. 13, end effector 100b may release the fixture it is gripping and the robot may stretch so that this end effector reaches, and then grips, the gripping fixture of the next adjacent well 194c. Thereafter, end effector 100a may release the gripping fixture of well 194a and the robot contract so that end effector 100a is registered with well 194b. Next, end effector 100b may grip the gripping fixture of well 194b. In this way, robot 200 may progress along bed 296 in "inch worm" fashion.

Numerous modifications will be apparent to those skilled in the art. For example, while the end effectors 10, 100 have been shown with two jaws, a greater number of co-operating jaws could be provided. Alternatively, a single jaw could be provided which acts opposite a fixed abutment. As another option, the collet bearings could be provided on the jaws rather than on the collet sleeve, in which case the cam surface 35 of the jaws would be provided on the collet sleeve. Further, cams other than collet bearings could be provided. While a compression spring 20 is shown between jaws 12, 14 to provide an opening force on the jaws, alternatively, torsion springs may be provided about the pivot pins 22, 24 for this purpose. Also, while a microswitch has been described as an optional mechanism to stop the forward travel of the collet sleeve, a rotary encoder on the sleeve drive could equally be used for this purpose.

The jaws 12, 14 have been shown with lips 70 which configure the jaws to grip gripping fixture 74. It will be apparent that the lips of the jaws may be configured differently to grip gripping fixtures with different configurations.

Other modifications will be apparent to those skilled in the art and, accordingly, the invention is defined in the claims.

What is claimed is:

1. An end effector comprising:
    a jaw pivotably mounted for movement between an open and a closed position;
    a collet sleeve mounted exteriorly of said jaw for sliding movement along said jaw toward and away from a gripping end of said jaw;
    one of said jaw and said collet sleeve having a cam surface, another of said jaw and said collet sleeve having a cam for riding along said cam surface;
    said cam surface having a ramp region configured such that as said collet sleeve moves toward said jaw gripping end while said cam rides along said ramp region, said jaw moves toward said closed position;
    said cam surface having a dwell region extending from said ramp region toward said jaw gripping end configured such that as said collet sleeve moves toward said jaw gripping end while said cam rides along said dwell region, a closing force on said jaw is not increased but said jaw is maintained in said jaw closed position.

2. An end effector comprising:
    a jaw pivotably mounted for movement between an open and a closed position;
    a collet sleeve mounted exteriorly of said jaw for sliding movement alone said jaw toward and away from a gripping end of said jaw;
    one of said jaw and said collet sleeve having a cam surface, another of said jaw and said collet sleeve having a cam for riding along said cam surface;

said cam surface having a ramp region configured such that as said collet sleeve moves toward said jaw gripping end while said cam rides along said ramp region, said jaw moves toward said closed position;

said cam surface having a dwell region extending from said ramp region toward said jaw gripping end configured such that as said collet sleeve moves toward said jaw gripping end while said cam rides along said dwell region, said jaw is maintained in said jaw closed position; and a matable electrical connector supported on said collet sleeve and directed toward said jaw gripping end.

3. An end effector comprising:

a jaw pivotably mounted for movement between an open and a closed position;

a collet sleeve mounted exteriorly of said jaw for sliding movement along said jaw toward and away from a gripping end of said jaw;

one of said jaw and said collet sleeve having a cam surface, another of said jaw and said collet sleeve having a cam for riding along said cam surface;

said cam surface having a ramp region configured such that as said collet sleeve moves toward said jaw gripping end while said cam rides along said ramp region, said jaw moves toward said closed position;

said cam surface having a dwell region extending from said ramp region toward said jaw gripping end configured such that as said collet sleeve moves toward said jaw gripping end while said cam rides along said dwell region, said jaw is maintained in said jaw closed position; and wherein an outer surface of an end portion of said collet sleeve proximate said jaw gripping end is tapered toward said jaw gripping end and wherein said tapered surface is exposed at least when said cam is on said dwell region of said cam surface.

4. The end effector of claim 1 wherein said jaw is a first jaw and comprising a second jaw pivotably mounted for movement between an open and a closed position in co-operating relation with said first jaw and wherein said collet sleeve surrounds said first jaw and said second jaw.

5. The end effector of claim 1 wherein said cam surface comprises an outer surface of said jaw and said cam comprises a collet bearing carried by said collet sleeve.

6. The end effector of claim 4 including a linear drive for sliding said collet sleeve.

7. The end effector of claim 6 including a compliant nut driver extending between said jaws.

8. The end effector of claim 6 wherein said sleeve has a V-shaped notch and said jaws have complementary V-shaped protrusions sized for mating reception by said V-shaped notch when each of said jaws is in a jaw closed position.

9. A collet end effector comprising:

at least two jaws pivotably mounted for movement between an open and a closed position;

a collet sleeve surrounding said jaws for sliding movement along said jaws toward and away from a gripping end of said jaws;

for each of said jaws, one of said each jaw and said collet sleeve having a cam surface and another of said each jaw and said collet sleeve having a cam for riding along said cam surface, said cam surface having a ramp region configured such that as said collet sleeve moves toward said jaws gripping end while said cam rides along said ramp region, said each jaw moves toward said closed position, said cam surface having a dwell region extending from said ramp region toward said jaw gripping end configured such that as said collet sleeve moves toward said jaw gripping end while said cam rides along said dwell region, a closing force on said each jaw is not increased but said each jaw is maintained in said jaw closed position.

10. The end effector of claim 9 including a matable electrical connector supported on said collet sleeve and directed toward said jaws gripping end.

11. A gripping system comprising:

a collet end effector having at least two jaws pivotably mounted for movement between an open and a closed position;

a collet sleeve surrounding said jaws for sliding movement along said jaws toward and away from a gripping end of said jaws;

for each of said jaws, one of said each jaw and said collet sleeve having a cam surface and another of said each jaw and said collet sleeve having a cam for riding along said cam surface, said cam surface having a ramp region configured such that as said collet sleeve moves toward said jaws gripping end while said cam rides along said ramp region, said each jaw moves toward said closed position, said cam surface having a dwell region extending from said ramp region toward said jaw gripping end configured such that as said collet sleeve moves toward said jaw gripping end while said cam rides along said dwell region, a closing force on said each jaw is not increased but said each jaw is maintained in said jaw closed position; and a gripping fixture configured for gripping by said jaws.

12. The gripping system of claim 11 wherein an outer surface of an end portion of said collet sleeve proximate said jaws gripping end is tapered toward said jaws gripping end and wherein said tapered surface is exposed at least when each said cam is on each said dwell region of each said cam surface.

13. The gripping system of claim 12 including a bed having a tapered well, said gripping fixture being mounted to a base of said well and wherein said collet sleeve tapered end portion has a complementary taper to said tapered well, each said dwell region having a length such that when said jaws grip said gripping fixture and said collet sleeve moves toward said jaw gripping end while each said cam rides along said dwell region, said collet sleeve tapered end portion mates with said well.

14. The gripping system of claim 13 including an electrical connector extending at said tapered end of said collet sleeve and wherein said bed has an outwardly facing interface at said well base arranged for mating with said collet sleeve electrical connector when said collet sleeve tapered end portion is mated with said well.

15. The gripping system of claim 11 including an electrical connector extending at an end portion of said collet sleeve and a bed to which said gripping fixture is mounted, said bed having an outwardly facing interface for mating with said collet sleeve electrical connector.

* * * * *

UNITED STATES PATENT AND TRADEMARK OFFICE
CERTIFICATE OF CORRECTION

PATENT NO. : 6,065,791
DATED : May 23, 2000
INVENTOR(S) : Carl J. Anders, et. al.

It is certified that error appears in the above-indentified patent and that said Letters Patent is hereby corrected as shown below:

Column 4, Line 63, replace "movement alone said jaw toward and away from a" with --movement along said jaw toward and away from a--.

Signed and Sealed this

Twentieth Day of March, 2001

Attest:

NICHOLAS P. GODICI

*Attesting Officer*    Acting Director of the United States Patent and Trademark Office